US012770138B2

(12) United States Patent
Chen et al.

(10) Patent No.: US 12,770,138 B2
(45) Date of Patent: Oct. 20, 2026

(54) RAPID CRYPTOCURRENCY TRANSACTION PROCESSING

(71) Applicant: Visa International Service Association, San Francisco, CA (US)

(72) Inventors: Yuexi Chen, Foster City, CA (US); Benjamin Price, Rockingham, VA (US)

(73) Assignee: Visa International Service Association, San Francisco, CA (US)

( * ) Notice: Subject to any disclaimer, the term of this patent is extended or adjusted under 35 U.S.C. 154(b) by 223 days.

(21) Appl. No.: 18/040,611

(22) PCT Filed: Aug. 18, 2020

(86) PCT No.: PCT/US2020/046841
§ 371 (c)(1),
(2) Date: Feb. 3, 2023

(87) PCT Pub. No.: WO2022/039726
PCT Pub. Date: Feb. 24, 2022

(65) Prior Publication Data
US 2023/0298009 A1 Sep. 21, 2023

(51) Int. Cl.
*G06Q 20/36* (2012.01)
*G06Q 20/02* (2012.01)
(Continued)

(52) U.S. Cl.
CPC ......... *G06Q 20/3678* (2013.01); *G06Q 20/02* (2013.01); *G06Q 20/10* (2013.01);
(Continued)

(58) Field of Classification Search
CPC .... G06Q 20/3678; G06Q 20/02; G06Q 20/10; G06Q 20/3223; G06Q 20/3267;
(Continued)

(56) References Cited

U.S. PATENT DOCUMENTS 6,609,114 B1 * 8/2003 Gressel ................ G06Q 20/105 705/50
10,055,715 B1 8/2018 Grassadonia et al.
(Continued)

FOREIGN PATENT DOCUMENTS

CN 110383757 A 10/2019
KR 20190124468 A 11/2019

OTHER PUBLICATIONS

M. Asplund, J. Lovhall and S. Nadjm-Tehrani, "In-Store Payments Using Bitcoin, " 2018 9th IFIP International Conference on New Technologies, Mobility and Security (NTMS), Paris, France, 2018, pp. 1-6.*
(Continued)

*Primary Examiner* — Steven S Kim
(74) *Attorney, Agent, or Firm* — Kilpatrick Townsend & Stockton LLP

(57) ABSTRACT

A method for conducting cryptocurrency transactions at an access device. The method includes initiating communication with an access device operated by a second user in a transaction between the first user and the second user, and then transmitting a request for transaction data to the access device. The method also includes receiving the transaction data comprising a transaction amount and a second cryptocurrency address from the access device from the access device, and signing, using a private cryptographic key, the first cryptocurrency address, the second cryptocurrency address, and the amount to create a signed cryptocurrency transaction. The method also includes transmitting the signed cryptocurrency transaction to a node of a blockchain network, and receiving a cryptocurrency transaction identifier from the node. The method also comprises generating a cryptogram using at least an access token on the mobile application and at least some of the transaction data.

15 Claims, 7 Drawing Sheets

(51) Int. Cl.
*G06Q 20/10* (2012.01)
*G06Q 20/32* (2012.01)
*G06Q 20/38* (2012.01)
*G06Q 20/40* (2012.01)

(52) U.S. Cl.
CPC ..... *G06Q 20/3223* (2013.01); *G06Q 20/3267* (2020.05); *G06Q 20/3278* (2013.01); *G06Q 20/3825* (2013.01); *G06Q 20/3829* (2013.01); *G06Q 20/385* (2013.01); *G06Q 20/389* (2013.01); *G06Q 20/401* (2013.01)

(58) Field of Classification Search
CPC ........... G06Q 20/3278; G06Q 20/3825; G06Q 20/3829; G06Q 20/389; G06Q 20/401; G06Q 20/36
See application file for complete search history.

(56) References Cited

U.S. PATENT DOCUMENTS

| | | | | | |
|---|---|---|---|---|---|
| 10,504,179 | B1 * | 12/2019 | McGuire | G06Q 40/04 | |
| 11,068,895 | B2 * | 7/2021 | Kinagi | H04W 12/02 | |
| 11,416,849 | B1 * | 8/2022 | Dowling | G06Q 20/42 | |
| 11,482,074 | B1 * | 10/2022 | Dickson | G06Q 20/3829 | |
| 11,941,627 | B2 * | 3/2024 | Balaraman | G06Q 20/102 | |
| 11,943,231 | B2 * | 3/2024 | Kinagi | H04W 12/63 | |
| 2004/0122768 | A1 * | 6/2004 | Creamer | G06Q 20/403 | 705/41 |
| 2010/0036741 | A1 * | 2/2010 | Cleven | G06Q 20/105 | 705/17 |
| 2014/0108263 | A1 * | 4/2014 | Ortiz | G06Q 20/3829 | 705/44 |
| 2015/0178724 | A1 * | 6/2015 | Ngo | G06Q 20/327 | 705/71 |
| 2015/0324789 | A1 | 11/2015 | Dvorak et al. | | |
| 2016/0036790 | A1 * | 2/2016 | Shastry | G06Q 20/32 | 713/168 |
| 2016/0203448 | A1 * | 7/2016 | Metnick | G06Q 20/40 | 705/64 |
| 2016/0260169 | A1 * | 9/2016 | Arnold | G06Q 20/381 | |
| 2016/0342994 | A1 * | 11/2016 | Davis | G06Q 40/02 | |
| 2016/0379208 | A1 * | 12/2016 | Deliwala | G06Q 20/3267 | 705/67 |
| 2017/0228731 | A1 * | 8/2017 | Sheng | G06Q 20/36 | |
| 2018/0053182 | A1 * | 2/2018 | Mokhasi | H04L 63/126 | |
| 2018/0191503 | A1 * | 7/2018 | Alwar | H04L 9/3242 | |
| 2019/0325408 | A1 * | 10/2019 | Goroff | G06Q 20/3825 | |
| 2019/0363889 | A1 * | 11/2019 | Wang | G06F 21/32 | |
| 2020/0027084 | A1 | 1/2020 | Groarke et al. | | |
| 2020/0045020 | A1 * | 2/2020 | Soundararajan | H04L 9/321 | |
| 2020/0082365 | A1 * | 3/2020 | Brock | G06Q 20/4012 | |
| 2021/0166221 | A1 | 6/2021 | Noh | | |
| 2021/0406887 | A1 * | 12/2021 | Ravinathan | G06Q 20/401 | |
| 2022/0198444 | A1 * | 6/2022 | Mee | G06Q 20/22 | |
| 2023/0010607 | A1 * | 1/2023 | Jang | G06Q 20/401 | |
| 2023/0169497 | A1 * | 6/2023 | Gyllenram | G06Q 20/3829 | 705/71 |

OTHER PUBLICATIONS

CN202080103148.1 , "Office Action", Nov. 15, 2024, 30 pages.

Office Action, mailed Jun. 12, 2025, for Chinese Patent Application No. CN202080103148.1, 28 pages.

Written Opinion, mailed Jul. 16, 2025, for Singapore Patent Application No. SG11202301070R, 9 pages.

PCT/US2020/046841 , "International Search Report and Written Opinion", May 14, 2021, 10 pages.

"EMV Payment Tokenization Primer and Lessons Learned", US Payments Forum, Available Online At: https://www.uspaymentsforum.org/wp-content/uploads/2019/06/EMV-Payment-Tokenization-Primer-Lessons-Learned-FINAL-June-2019.pdf, Jun. 30, 2019, 43 pages.

Basin et al., "The EMV Standard: Break, Fix, Verify", Available at: https://arxiv.org/pdf/2006.08249.pdf, Jun. 15, 2020, 16 pages.

EP20950453.9 , "Extended European Search Report", Jun. 20, 2023, 10 pages.

* cited by examiner

RAPID CRYPTOCURRENCY TRANSACTION PROCESSING

CROSS-REFERENCE TO RELATED APPLICATIONS

This application is a National Stage of International Application No. PCT/US2020/046841, filed on Aug. 18, 2020, which is incorporated by reference in its entirety for all purposes.

BACKGROUND

Cryptocurrencies such as Ethereum, Bitcoin, and USDC exist. However, cryptocurrencies are not widely used to conduct payment transactions at traditional merchants. To use a cryptocurrency, a merchant would need dedicated devices and specialized software applications to accommodate consumers that wish to conduct transactions associated with different cryptocurrencies associated with different cryptocurrency wallets. Further, each cryptocurrency can also require a dedicated process flow. Even if a merchant wanted to allow users to conduct transactions with different cryptocurrencies, the merchant would have to manage all of these devices and specialized processes on their own. As a result of all of this difficulty, most merchants currently do not allow users to select from multiple cryptocurrencies when making payments.

Another problem with cryptocurrencies is that users need dedicated stand-alone software for managing different cryptocurrencies and different cryptocurrency wallets. Users must also manually enter (e.g., or scan a merchant QR code comprising) a transaction amount and a cryptocurrency address from which the funds can be sent, verify the transaction outcome, and wait for a confirmation of a transaction. Confirmations of transactions alone may take (on average) 10 minutes or longer for a typical cryptocurrency transaction such as a Bitcoin transaction.

Embodiments of the invention are directed to addressing these and other problems, individually and collectively.

BRIEF SUMMARY

One embodiment can include a method. The method comprises initiating, by a mobile application stored on a mobile device operated by a first user, communication with an access device operated by a second user in a transaction between the first user and the second user; transmitting, by the mobile application, a request for transaction data; receiving, by the mobile application, the transaction data comprising a transaction amount and a second cryptocurrency address from the access device from the access device; signing, by the mobile application using a private cryptographic key, the first cryptocurrency address, the second cryptocurrency address, and the amount to create a signed cryptocurrency transaction; transmitting, by the mobile application, the signed cryptocurrency transaction to a node of a blockchain network; receiving, by the mobile application, a cryptocurrency transaction identifier from the node; generating, by the mobile application, a cryptogram using at least an access token on the mobile application and at least some of the transaction data; and transmitting, by the mobile application, at least the cryptogram, the token, and the cryptocurrency transaction identifier to the access device, wherein the access device generates an authorization request message requesting authorization for the transaction.

Another embodiment includes a mobile device. The mobile device comprises: a processor; and a non-transitory computer readable medium, the non-transitory computer readable medium comprising code, executable by the processor, for implementing a method. The method comprises: initiating, by a mobile application stored on the mobile device operated by a first user, communication with an access device operated by a second user in a transaction between the first user and the second user; transmitting, by the mobile application, a request for transaction data; receiving, by the mobile application, the transaction data comprising a transaction amount and a second cryptocurrency address from the access device from the access device; signing, by the mobile application using a private cryptographic key, the first cryptocurrency address, the second cryptocurrency address, and the amount to create a signed cryptocurrency transaction; transmitting, by the mobile application, the signed cryptocurrency transaction to a node of a blockchain network; receiving, by the mobile application, a cryptocurrency transaction identifier from the node; generating, by the mobile application, a cryptogram using at least an access token on the mobile application and at least some of the transaction data; and transmitting, by the mobile application, at least the cryptogram, the token, and the cryptocurrency transaction identifier to the access device, wherein the access device generates an authorization request message requesting authorization for the transaction.

Another embodiment includes a method. The method comprises: receiving, by a token provider computer, an authorization request message comprising a cryptogram, an access token, and a cryptocurrency transaction identifier from an access device; validating, by the token provider computer, the cryptogram; mapping, the access token to a first cryptocurrency address; extracting the cryptocurrency transaction identifier from the authorization request message; and querying a node in a blockchain network with the first cryptocurrency address and the cryptocurrency transaction identifier to verify that a mobile application on a mobile device that interacted with the access device previously transmitted a signed cryptocurrency transaction to the node of the blockchain network.

Further details regarding embodiments of the invention can be found in the Detailed Description and the Figures.

DETAILED DESCRIPTION

Figure 1:
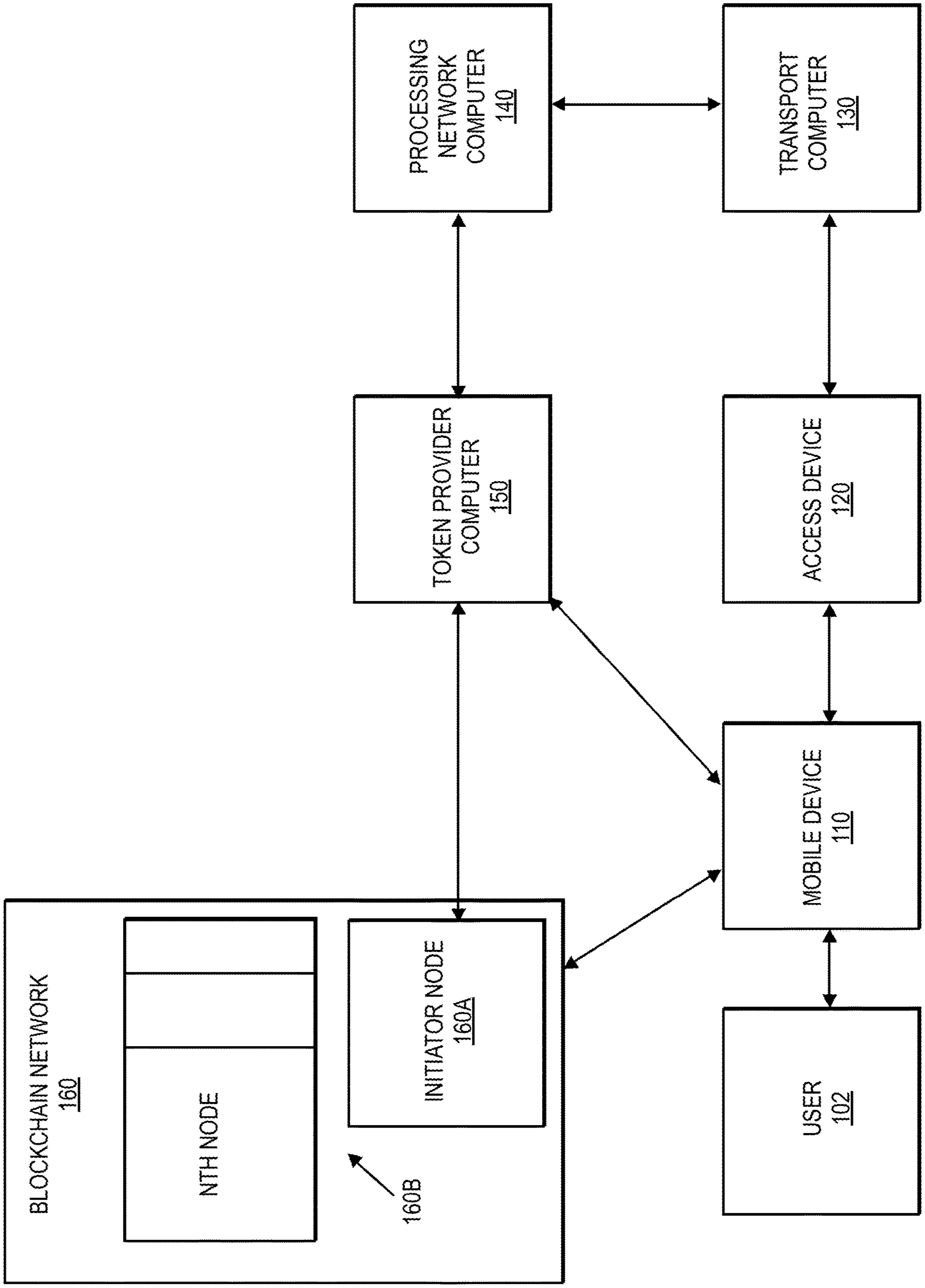
FIG. 1 shows a block diagram of a system according to an embodiment of the invention.

Embodiments of the invention include a method of conducting a cryptocurrency transaction between a user and a resource provider. In order to conduct a cryptocurrency transaction, a user interacts with an access device using a mobile device. The access device can be operated by a resource provider. The mobile device may comprise a mobile wallet application configured to initially process and submit cryptocurrency transactions to a blockchain network.

Responsive to processing and submitting the transaction, the mobile wallet application may provide (e.g., transmit) an access token associated with a cryptocurrency address of the user to the access device. The access token may be a payment token. The access device may then initiate an authorization process using the access token. For example, the access device may transmit an authorization request message comprising at least the access token to a token provider computer. The token provider computer may communicate with a blockchain network to further verify the transaction and transmit an authorization response message back to the access device. The resource provider may then determine whether or not to grant access of a resource to a user based on the received authorization response message.

Embodiments enable the authorization and settlement of cryptocurrency transactions using an existing payments infrastructure. Furthermore, embodiments avoid a need for merchants to manually process cryptocurrency transaction data (e.g., such as a cryptocurrency address) or employ third-party software to process cryptocurrency transaction data.

Prior to discussing embodiments of the invention, some terms can be described in further detail.

A "mobile device" may comprise any suitable electronic device that may be transported and operated by a user, which may also provide remote communication capabilities to a network. A mobile communication device may communicate using a mobile phone (wireless) network, wireless data network (e.g., 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g., cellular phones), PDAs, tablet computers, net books, laptop computers, wearable devices (e.g., watches), vehicles such as automobiles and motorcycles, personal music players, handheld specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "application" may be a computer program that is used for a specific purpose.

"Authentication data" may include any data suitable for verifying something. Authentication data may include data authenticating a user or a mobile device. Authentication data may be obtained from a user or a device that is operated by the user. Examples of authentication data obtained from a user may include PINs (personal identification numbers), biometric data, passwords, etc. Examples of authentication data that may be obtained from a device may be include device serial numbers, hardware secure element identifiers, device fingerprints, phone numbers, IMEI numbers, etc.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

An "electronic wallet" or "digital wallet" can include an electronic device or service that allows an individual to conduct electronic commerce transactions. A digital wallet may store user profile information, credentials, bank account information, one or more digital wallet identifiers and/or the like and can be used in a variety of transactions, such as, but not limited to, eCommerce transactions, social network transactions, money transfer/personal payment transactions, mobile commerce transactions, proximity payment transactions, gaming transactions, etc. A digital wallet may be designed to streamline the purchase and payment process. A digital wallet may allow the user to load one or more payment cards onto the digital wallet so as to make a payment without having to enter an account number or present a physical card.

A "token" may be a substitute value for a credential. An "access token" may be a token used to access something. A token may be a string of numbers, letters, or any other suitable characters. Examples of tokens include access tokens (e.g., payment tokens), personal identification tokens, etc.

A "token provider computer" can include a system that services tokens. In some embodiments, a token provider computer can facilitate requesting, determining (e.g., generating) and/or issuing tokens, as well as maintaining an established mapping of tokens to primary account numbers (PANs) in a repository (e.g. token vault). In some embodiments, the token provider computer may establish a token assurance level for a given token to indicate the confidence level of the token to PAN binding. The token provider computer may include or be in communication with a token vault where the generated tokens are stored. The token provider computer may support token processing of payment transactions submitted using tokens by de-tokenizing the token to obtain the actual PAN. In some embodiments, a token provider computer may include a tokenization computer alone, or in combination with other computers such as a processing network computer. Various entities of a tokenization ecosystem may assume the roles of the token service provider. For example, payment networks and issuers or their agents may become the token service provider by implementing the token services according to embodiments of the present invention.

A "user" may include an individual. In some embodiments, a user may be associated with one or more personal accounts and/or mobile devices. The user may also be referred to as a cardholder, account holder, or consumer in some embodiments.

A "resource provider" may be an entity that can provide a resource such as goods, services, information, and/or locations. Examples of resource providers includes merchants, data providers, transit agencies, governmental entities, venue and dwelling operators, etc. A "resource provider computer" may be any suitable computing device that may be operated by, or on behalf of, a resource provider.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "token request message" may be an electronic message that requests a token. In some embodiments, a token request message may comprise a token requestor identifier, and an address to a token service computer.

A "token response message" may be an electronic message reply to a token request message. A token response message may include at least one or more tokens, an address of the token requestor device requesting the token, etc.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CW (card verification value), a dCW (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. PA equipment) that indicates approval of the transaction. The code may serve as proof of authorization.

A "blockchain" can be a database that maintains a continuously-growing list of records secured from tampering and revision. A blockchain may include a number of blocks of event records recorded by one or more peers. Each block in the blockchain can contain also include a timestamp and a link to a previous block. For example, each block may include a hash of the previous block. Stated differently, event records in a blockchain may be stored as a series of "blocks," or permanent files that include a record of a number of events occurring over a given period of time. Blocks may be appended to a blockchain by an appropriate peer after it completes the block and the block is validated. In embodiments of the invention, a blockchain may be distributed, and a copy of the blockchain may be maintained at each peer in a blockchain network.

A "node" of a blockchain can be a computer or software node. In some cases, each node in a blockchain network has a copy of a digital ledger or blockchain. Each node checks the validity of each transaction. In some cases, if a majority of nodes say that a transaction is valid then it is written into a block.

A "key pair" may include a pair of linked cryptographic keys. For example, a key pair can include a public key and a corresponding private key. In a key pair, a first key (e.g., a public key) may be used to encrypt a message, while a second key (e.g., a private key) may be used to decrypt the encrypted message. Additionally, a public key may be able to verify a digital signature created with the corresponding private key. The public key may be distributed throughout a network in order to allow for verification of messages signed using the corresponding private key. Public and private keys may be in any suitable format, including those based on RSA or elliptic curve cryptography (ECC). In some embodiments, a key pair may be generated using an asymmetric key pair generation algorithm. However, a key pair may also be generated using other means, as one of ordinary skill in the art would understand.

A "digital signature" may be an electronic signature for a message. A digital signature may be a numeric data value, an alphanumeric data value, or any other type of data. In some embodiments, a digital signature may be a unique data value generated from a message (or data packet) and a private key using a cryptographic algorithm. In some embodiments, a validation algorithm using a public key may be used to verify the signature.

A "payment processing network" may include data processing subsystems, networks, server computers and operations used to support and deliver authorization services, exception file services, and clearing and settlement services. The payment processing network (130) may be any suitable network able to transmit and receive financial system transaction messages (e.g., ISO 8583 messages), and process original credit and debit card transactions. An exemplary payment processing system may include VisaNet™. Payment processing systems such as VisaNet™ are able to process credit card transactions, debit card transactions, and other types of commercial transactions.

"Transaction data" may be data that is associated with a payment transaction. Transaction data may include a transaction amount, a date of a transaction, a primary account number associated with a user initiating the transaction.

A "cryptocurrency transaction" can be a payment transaction that utilizes a cryptocurrency instead of fiat currency. Cryptocurrency transactions may include (but are not limited to) transactions using Bitcoin, Ethereum, and USDC. Cryptocurrency transactions may further be processed by a blockchain network. Responsive to processing, cryptocurrency transactions may be added to a ledger of transactions included within the blockchain network.

A "cryptocurrency transaction identifier" can include any suitable data element that identifies a cryptocurrency transaction. For example, a cryptocurrency transaction identifier may be a string of alphanumeric characters. In some embodiments, a cryptocurrency transaction identifier may be a hashed value.

A "cryptocurrency address" can be an identifier that indicates a destination and/or a source for a cryptocurrency payment. For example, a cryptocurrency address may be a string of at least 26 to 35 alphanumeric characters. As another example, a cryptocurrency address may be a public key. Each cryptocurrency transaction may include a cryptocurrency address of a sender (e.g., a source of a cryptocurrency payment) and a cryptocurrency address of a recipient (e.g., a destination of a cryptocurrency payment).

A cryptocurrency transaction can involve a mobile device of a first user receiving a second cryptocurrency address associated with a second user. The mobile device can receive the second cryptocurrency address in any number of ways. For example, the mobile device can receive the second cryptocurrency address when the first user manually enters the second cryptocurrency address into the mobile device. The first user or the second user could alternatively scan a QR code comprising the second cryptocurrency address using the mobile device. In some cases, a first cryptocurrency address associated with the first user can additionally be obtained by the mobile device. The first cryptocurrency address can be obtained by the first user manually or automatically entering (e.g., via a QR code) the first cryptocurrency address into the mobile device, or by retrieving it from a memory (e.g., a secure memory) of the mobile device. The first user could also enter a transaction amount and a cryptocurrency coin type (e.g., Bitcoin, Ethereum, etc.) into the mobile device.

The first user can generate a cryptocurrency transaction using at least the first cryptocurrency address, the second cryptocurrency address, the transaction amount, and the cryptocurrency coin type. The cryptocurrency transaction is signed using a private key associated with the first user, and the signed transaction and the transaction data are then transmitted to a node on a blockchain network, where it is then validated.

In a typical cryptocurrency transaction, the mobile device of first user and a computing device of the second user can query a node on the blockchain network to ensure that the transaction was completed. Confirming some conventional cryptocurrency transactions takes a significant amount of time (e.g., up to 10 minutes or more), compared to confirming conventional transactions involving fiat currency (e.g., a credit card transaction). Embodiments of the invention can address such issues.

FIG. 1 shows a cryptocurrency transaction system 100 according to an embodiment. The system 100 comprises a mobile device 110 including a mobile wallet application, an access device 120, a transport computer 130, a processing network computer 140, a token provider computer 150, and a blockchain network 160. The mobile device 110 may be operated by a user 102, while the access device 120 may be operated by a resource provider such as a merchant. Each of the components shown in FIG. 1 may be in operative communication with each other.

The components in the system in FIG. 1 can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Referring to FIG. 1, user 102 may wish to initiate a transaction to obtain a good and/or service offered by a resource provider. In embodiments, user 102 may further wish to complete the transaction using a cryptocurrency. In order to initiate a cryptocurrency transaction, user 102 may access a mobile wallet application configured for cryptocurrency transactions on the mobile device 110. In embodiments, mobile device 110 may further include an access token provisioned by token provider computer 150. Mobile device 110 may then be used to initiate a cryptocurrency transaction with access device 120 operated by a resource provider. In some embodiments, an APDU messaging-protocol may be used between the mobile device 110 and the access device 120 when a transaction is conducted.

The mobile device 110 may be configured to receive one or more transaction data elements from access device 120 and generate a cryptocurrency transaction request using at least the one or more transaction data elements and the provisioned access token. The mobile device 110 may also be configured to transmit the generated cryptocurrency transaction directly to the blockchain network 160. The mobile device 110 may also be configured to later transmit cryptocurrency transaction data comprising the access token and an identifier associated with the cryptocurrency transaction to access device 120.

Access device 120 may a POS terminal, and may be configured to generate an authorization request message using the received cryptocurrency transaction data. The generated authorization request is then transmitted to token provider computer 150 via transport computer 130 and/or processing network computer 140.

The transport computer 130 may be associated with an acquirer, which may typically be a business entity (e.g., a commercial bank) that has a business relationship with a particular merchant or other entity. The transport computer 130 may be more specifically referred to as an acquirer computer.

The processing network computer 140 may be disposed between (in an operational sense) the transport computer 130 and the token provider computer 150. The processing network computer 140 may include data processing subsystems, networks, and operations used to support and deliver authorization services, exception file services, and clearing and settlement services. For example, the processing network computer 140 may comprise a server coupled to a network interface (e.g., by an external communication interface), and databases of information. The processing network computer 140 may be representative of a payment processing network. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The processing network computer 140 may use any suitable wired or wireless network, including the Internet.

The token provider computer 150 may be disposed between the processing network computer 140 and the blockchain network 160. The token provider computer 150 may be any suitable device that may be any suitable device that handles, supervises, or manages token generation or token processing.

The processing network computer 140, the transport computer 130, and the token provider computer 150 may operate suitable routing tables to route authorization request messages and/or authorization response messages using payment credentials, merchant identifiers, or other account identifiers. In embodiments, the token provider computer 150 may further be configured to route at least one or messages to an initiator node 160A of blockchain network 160 in order to confirm completion of the cryptocurrency transaction.

The blockchain network 160 may include any suitable subsystems and/or networks used to manage blockchain services. The blockchain network 160 may further include a plurality of nodes 160B, such that at least one node is an initiator node 160A. In embodiments, initiator node 160A may be a node associated with the mobile wallet application on the mobile device 110. Responsive to receiving a cryptocurrency transaction from the mobile device 110 of the user 102, the initiator node 160A may validate and propagate the cryptocurrency transaction to other nodes of the blockchain network 160.

Figure 2:
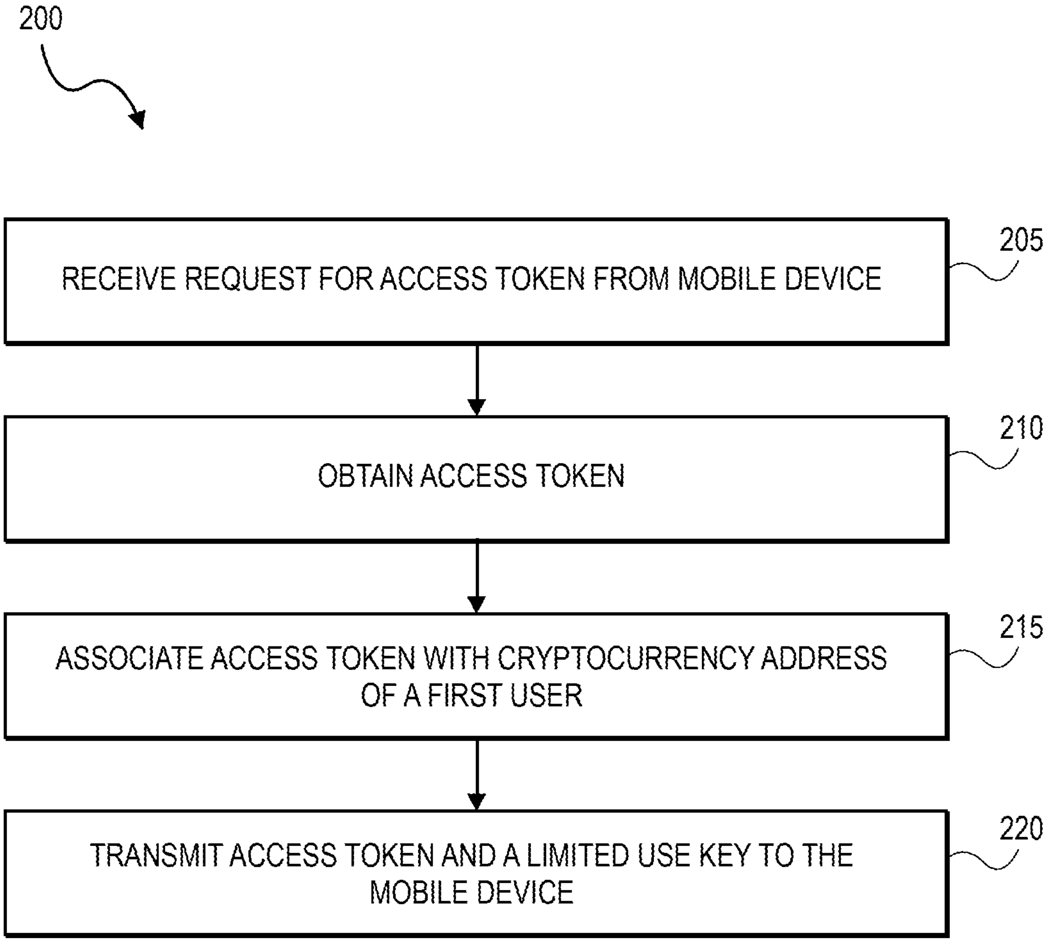
FIG. 2 shows a flowchart illustrating a method for provisioning an access token according to an embodiment.

FIG. 2 describes a process 200 for provisioning an access token to a mobile device operated by a user. Provisioning of the access token may be initiated in response to the user registering the mobile device and/or the mobile wallet application with a token provider computer. In some embodiments, provisioning of the access token may occur when the user initiates a first cryptocurrency transaction using the mobile device. In most embodiments, process 200 is performed by a token provider computer.

At block 205, the token provider computer may receive a token request message for an access token from a mobile device operated by a user. The token request message may be generated by a mobile wallet application on the mobile device in response to the user initiating a registration process or a first cryptocurrency transaction using the mobile device. The token request message may comprise a user identifier and a cryptocurrency address associated with the user. In some embodiments, the user may be prompted to manually enter the cryptocurrency address into the mobile device as part of the registration process.

At block 210, the token provider computer may obtain an access token in response to the received token request. In some embodiments, the token provider computer may generate the access token. In other embodiments, the token provider computer may communicate with a token vault computer and retrieve the access token from a plurality of pre-generated access tokens stored within the token vault. In some embodiments, the access token is an EMV (Europay-MasterCard-Visa) token.

At block 215, the token provider computer may associate the access token with the cryptocurrency address received within the token request. In some embodiments, the token provider computer may include a token mapping table for mapping each access token to a cryptocurrency address.

At block 220, the token provider computer transmits a token response message comprising the access token and a limited use key to the mobile device. The limited use key may be used to form cryptogams. In some embodiments, the token provider computer may request the limited use key from a key management server computer. The limited use key may further include at least one or more thresholds, wherein the thresholds may be an amount of uses, a time duration, and/or a maximum transaction amount for which the limited use key is valid. For example, if a threshold for a limited use key defines an amount of uses as 3, the limited use key will no longer be considered valid if a user attempts to use it a fourth time. In some embodiments, responsive to expiration of a limited use key, the mobile device may transmit a replenishment request to the token provider computer in order to receive a new limited use key. In some embodiments, the token provider computer may forward the replenishment request to the key management server, wherein the key management server generates the new limited use key and transmits the generated key to the token provider computer. In other embodiments, the mobile device may directly transmit the replenishment request to the key management server. The key management server may then directly transmit the new limited use key to the mobile device.

The mobile device may use the access token and the limited use key received from the token provider computer for conducting cryptocurrency transactions at an access device. Embodiments for conducting the cryptocurrency transactions are further discussed below in FIGS. 3 and 4.

Figure 3:
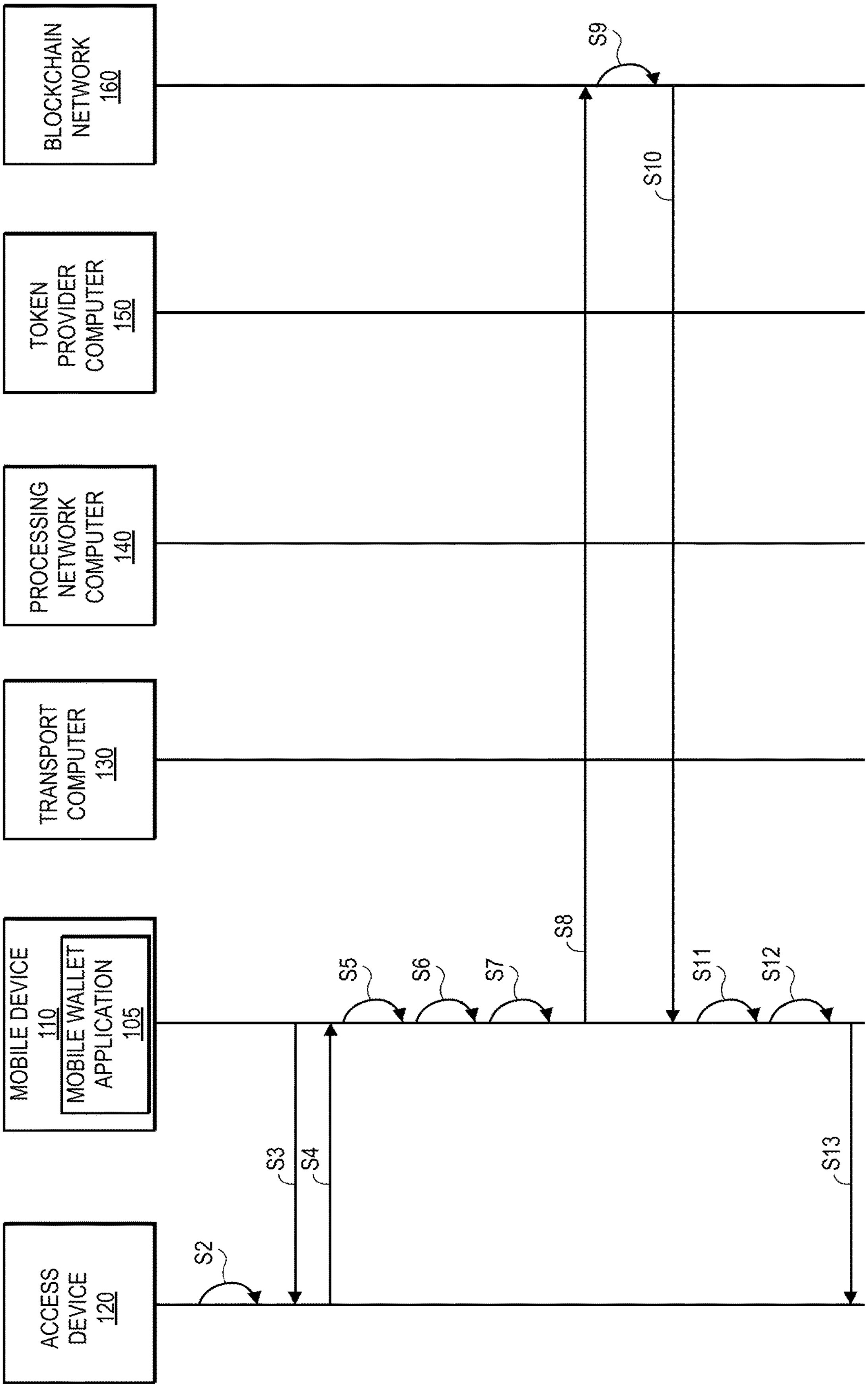
FIG. 3 show a flow diagram illustrating a method for conducting a cryptocurrency transaction according to an embodiment.

In FIG. 3, a first user may use a mobile device 110 to request access to a good and/or service from an access device 120 operated by a second user. The mobile device 110 may be operated by the first user. The mobile device 110 may include a mobile wallet application 105, which stores cryptocurrency information associated with the first user. In some embodiments, the first user may be a consumer and the second user may be a resource provider, such as a merchant.

At step S2, the resource provider may provide a transaction amount for the requested good and/or service to the access device 120. In some embodiments, the access device 120 may prompt an employee of the resource provider to manually enter the transaction amount into the access device 120. In other embodiments, the access device 120 may calculate or otherwise determine the transaction amount. For example, the access device 120 may determine the transaction amount after scanning one or more items that the user wants to purchase from the resource provider.

Responsive to the resource provider providing the transaction amount, the user (i.e., the first user) may initiate communication between the mobile device 110 and the access device 120 by tapping (or holding) the mobile device 110 near a contactless interface of the access device 120. In response to initiating communication between the mobile device 110 and the access device 120, the mobile device 110 and the access device 120 may exchange messages. In some cases, the message exchange may use a wireless communication mechanism such as NFC or Bluetooth. The exchange of messages between the mobile device 110 and the access device 120 may be used to gather information to conduct a transaction. In some embodiments, the exchange of messages includes at least six or more messages exchanged between the mobile device 110 and the access device 120 after the mobile device 110 is tapped to the access device 120. In some embodiments, the messages can be in the form of APDU (application protocol data unit) commands and responses. Communications may specifically be carried out between the mobile application stored on the mobile device 110 and the contactless interface of the access device 120. In some embodiments, the mobile application may be the mobile wallet application 105. In some embodiments, the mobile device 110 may include host card emulation (HCE) technology which launches the mobile wallet application 105 after the mobile device 110 initiates communication with the access device 120.

The access device 120 may detect the mobile device 110 when it is near the contactless interface of access device 120. In response to detecting the presence of mobile device 110, the access device 120 may send an available applications request to mobile device 110 in order to request information on which payment application(s) (e.g., a list of AID(s)) may be available on the mobile wallet application 105. In some embodiments, the available application(s) request may be in the form of a select PPSE command. The available applications request may include a payment environment identifier (e.g., a PPSE name) to identify the payment environment supported by access device 120 and the mobile wallet application 105.

After the mobile wallet application 105 receives the available application(s) request, the mobile wallet application 105 may process the received request by recognizing the payment environment identifier (e.g., PPSE name) included in the request. The mobile wallet application 105 may then send an available applications response back to access device 120. The available applications response may include a list of available AIDs (application identifiers). In some embodiments, the available applications response may be in the form of a select PPSE response.

The access device 120 may receive the available applications response and select a suitable application from the list of available AIDs included within the available applications response. In some embodiments, the selected application may be a highest priority application available on mobile wallet application 105 that is supported by access device 120. Access device 120 may transmit an application selection message comprising the selected application to mobile wallet application 105. In some embodiments, the application selection message may be in the form of a select AID command.

At step S3, the mobile wallet application 105 may transmit a request for transaction data to the access device 120. The request may be one of the above-described messages passing from the mobile device 110 the access device 120, or may be a different message. The transaction data may include a transaction amount and a cryptocurrency address of the resource provider. The cryptocurrency address of the resource provider may be a unique identifier comprising between 26 to 35 alphanumeric characters that identifies the resource provider to a blockchain network 160. In some embodiments, the cryptocurrency address may be less than 26 alphanumeric characters or longer than 35 alphanumeric characters. In some embodiments, the cryptocurrency is not limited to only alphanumeric characters and may include one or more emoticons. In some embodiments, the cryptocurrency address may be derived from a public key. In some embodiments, the cryptocurrency address may be a URL.

In some embodiments, the request transmitted to the access device 120 in step S3 may be a request for terminal transaction data. The request for terminal transaction data may be in the form of a select AID response and may include AID file control information (FCI). The terminal transaction data request may include a list of transaction data identifiers to request the appropriate data from access device 120. The list of transaction data identifiers can be in the form of a processing options data object list (PDOL).

The access device 120 may generate a transaction response comprising the transaction data including at least the transaction amount and the cryptocurrency address of the resource provider to the mobile wallet application 105. In embodiments, the access device 120 may have previously stored the cryptocurrency address of the resource provider, or it may have been obtained by the access device 120 (e.g., be scanning a QR code or by a person manually entering it into the access device 120.

In some embodiments, the transaction response may include terminal transaction data that is generated by the access device 120 responsive to the access device 120 receiving the terminal transaction data request. In some embodiments, the terminal transaction data may be in the form of a GPO ("Get Processing Options") command, and may include the requested terminal transaction data in PDOL. Terminal transaction data may include all of the elements of the transaction response, such as the transaction amount and the cryptocurrency address of the resource provider, along with additional transaction information such as terminal transaction qualifiers (e.g., TTQ).

In some embodiments, the resource provider may wish to settle the transaction in fiat currency rather than cryptocurrency. In such embodiments, the access device 120 may generate a transaction response comprising the transaction amount and a cryptocurrency address that only comprises null and/or zero values. In embodiments where the resource provider wishes to settle the transaction using cryptocurrency, the cryptocurrency address of the resource provider (as described above) is used. In some embodiments, the resource provider may be program the access device 120 so one is able to select whether the particular transaction being conducted will settle in fiat currency or cryptocurrency.

At step S4, the access device 120 may transmit the transaction response (e.g., the terminal transaction response) comprising the transaction data including at least the transaction amount and the cryptocurrency address of the resource provider to the mobile wallet application 105. The message in step 4 may be a message that passes from the access device 120 to the mobile device 110 as described above prior to the description of step S3, or it may be a different message.

At step S5, the mobile wallet application 105 may perform an authentication process of the user. The authentication process may require that the user provide authentication data such as a password, a PIN, and/or biometric information (e.g., such as a fingerprint, a voice recording, a retina scan, and/or a facial scan) to the mobile wallet application 105 or the mobile device 110. In order to facilitate the authentication process, the mobile device 120 may include a keypad for entering authentication information (e.g., a password, a PIN, and/or another suitable security code) and/or one or more biometric sensors (e.g., a fingerprint sensor, a facial recognition sensor, etc.) for receiving biometric samples.

In some embodiments, prior to initiation of the transaction, a user may be prompted to register one or more pieces of authentication data with the mobile wallet application 105 during a registration process. The registered authentication data may be stored on the mobile device 110 for later use during a transaction. When performing the authentication process, the mobile device 110 retrieve the authentication data stored on the mobile device 110, and may match it to authentication data entered into the mobile application 105 by the user during a transaction.

At step S6, the mobile wallet application 105 may optionally determine an exchange rate for the transaction amount (which is in fiat currency) relative to a cryptocurrency amount. For example, if a resource provider charges a transaction amount of $5 in fiat currency for a product, the mobile wallet application 105 may determine that the transaction amount is equivalent to 0.0005 Bitcoin, so the exchange rate would be $10,000 per 1 Bitcoin. In some embodiments, the mobile wallet application 105 may determine the exchange rate using a remote processing network and/or a third-party API that connects to an exchange rate server (not shown).

The mobile wallet application 105 may then retrieve a cryptocurrency address associated with the user. In some embodiments, one or more cryptocurrency addresses associated with the user may be stored on the mobile wallet application 105. In some embodiments, each cryptocurrency address of the one or more cryptocurrency addresses may be associated with a different cryptocurrency type. For example, a mobile wallet application may include a cryptocurrency address of a user that can be used to conduct transactions using Bitcoin and another cryptocurrency address of a user that can be used to conduct transactions using Ethereum. In some embodiments, the mobile wallet application 105 may display (e.g., using identifiers and/or tags such as "BTC" for a Bitcoin address) each cryptocurrency address that is available to the user and can prompt the user to select a desired cryptocurrency address to use for the transaction. In other embodiments, a default cryptocurrency address may be used for each transaction.

At step S7, the mobile wallet application 105 may generate a cryptocurrency transaction using at least a cryptocurrency address associated with the user, the cryptocurrency address associated with the resource provider, and the transaction amount.

In the event that the cryptocurrency address associated with the resource provider is all zeroes (e.g., for cases where a resource provider wishes to receive a payment of fiat currency) or is some other pre-defined data string that is not a real address, the mobile wallet application 105 may instead use a cryptocurrency address associated with a third-party service provider. A third-party service provider computer associated with the third-party service provider may instead receive a user's intended payment in cryptocurrency and transmit a payment in fiat currency that is equivalent to the intended cryptocurrency payment to the resource provider.

The generated cryptocurrency transaction may further be signed using a private key of a public-private key pair associated with the mobile wallet application 105. A public key of the public-private key pair associated with mobile wallet application 105 may be included within the generated cryptocurrency transaction, wherein the public key can be used to verify the signature of the private key.

At step S8, the mobile wallet application 105 transmits the signed cryptocurrency transaction to a node of a blockchain network 160. The node may be a computer in the blockchain network 160 that stores a ledger of transactions in the form of a blockchain. In some embodiments, the node may be associated with the mobile wallet application 105. For example, all cryptocurrency transactions generated by the mobile wallet application 105 may be transmitted to a particular node of blockchain network 160. The mobile wallet application 105 may transmit all generated cryptocurrency transactions to the particular node using a node identifier (e.g., such as an IP address).

At step S9, the node of the blockchain network 160 verifies the signed cryptocurrency transaction with the public key of the public-private key pair associated with the mobile wallet application 105. The node then generates a cryptocurrency transaction identifier for the signed cryptocurrency transaction and propagates the cryptocurrency transaction to a plurality of nodes of the blockchain network 160. The node transmits the generated cryptocurrency transaction identifier to the mobile wallet application 105 at step S10.

At step S11, the mobile wallet application 105 generates a cryptogram (e.g., an EMV cryptogram) using an access token and at least some of the transaction data. The transaction data may include one or more of a transaction amount, resource provider identifier, an access token such as a payment token, terminal ID, an unpredictable number (UN), automatic transaction counter (ATC), etc. In some embodiments, the mobile wallet application 105 may use a limited use key to generate the cryptogram. As noted above, the limited use key may be a limited use key (e.g., a cryptographic key) provisioned to the mobile wallet application 105 during a provisioning of the access token. In some embodiments, the limited use key may be a symmetric cryptographic key (e.g., such as 3DES/AES) or an asymmetric cryptographic key (e.g., such as RSA/ECC). In other embodiments, the limited use key may be a different limited use key provisioned to the mobile wallet application 105 after one or more previous limited use keys expired (e.g., after a certain number of uses).

At step S12, the mobile wallet application 105 inserts the cryptocurrency transaction identifier into a data field such as an issuer application data (e.g., IAD) field of the transaction data.

At step S13, the mobile wallet application 105 transmits at least the cryptogram, the token, and the transaction data comprising the cryptocurrency transaction identifier to the access device 120. Responsive to receiving the cryptogram, the token, and the transaction data, the access device 120 may generate an authorization request message using at least the cryptogram, the token, and the transaction data. In some embodiments, the transmission from the mobile device 110 to the access device 120 may be a GPO response, which includes at least the cryptogram, the token, and the transaction data.

In some embodiments, after receiving the transaction processing information, the access device 120 may transmit a request for account data to mobile wallet application 105 in order to read additional account data stored on the mobile device 110. In some embodiments, the account data request may be in the form of a read record command, and may include an application file locator (AFL) indicating the location of the account data that access device 120 is attempting to read.

Mobile wallet application 105 may then send account data stored at the location indicated by the AFL to the access device 120. In some embodiments, the account data may be in the form of a read record response. Account data may include, for example, application usage control that indicates restrictions on the usage and services allowed for the application, the cardholder's name, and/or other account related data that is accessible at the AFL location.

Figure 4:
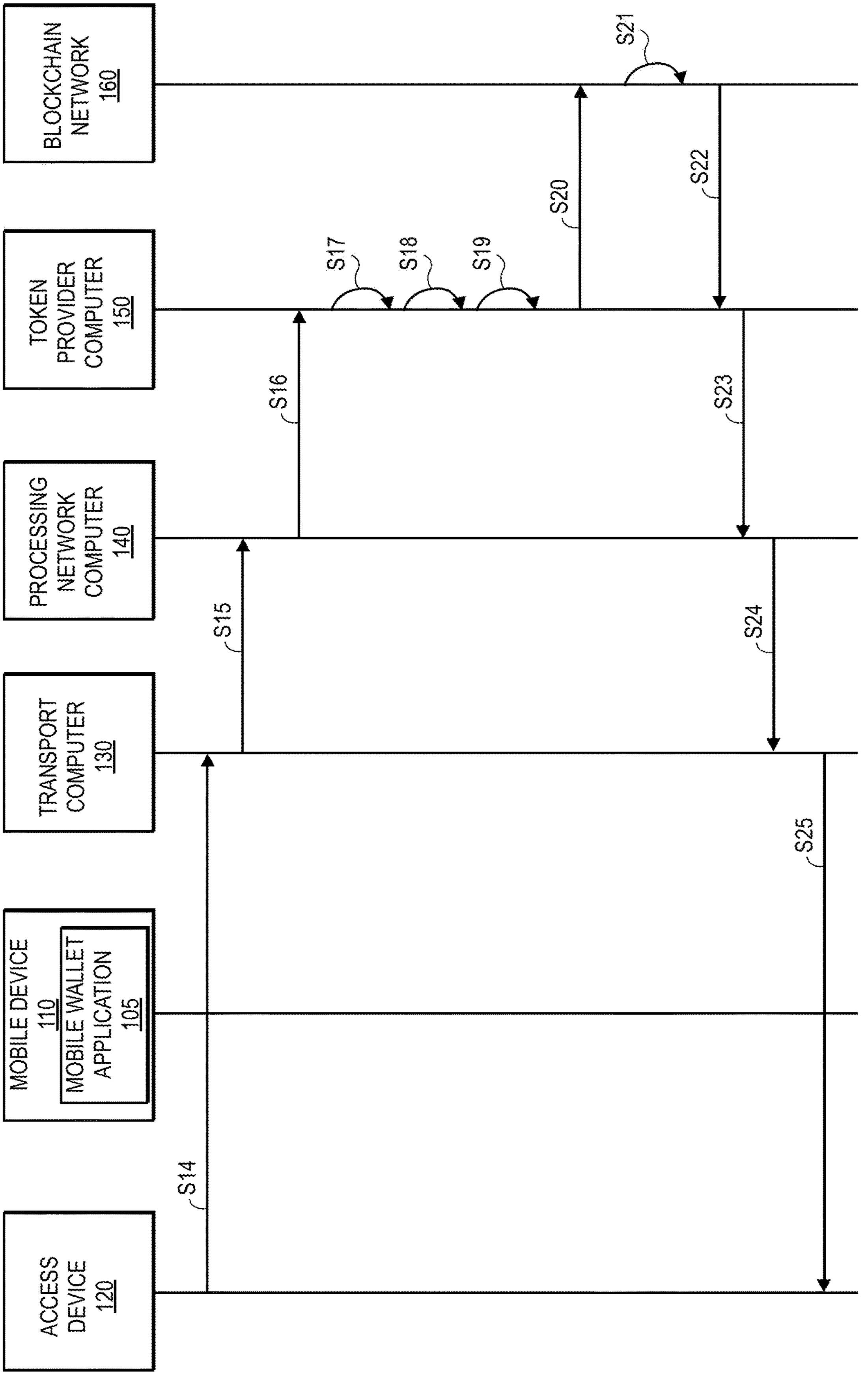
FIG. 4 shows a continuation of the flow diagram of FIG. 3.

Referring now to FIG. 4, at step S14, the access device 120 transmits the authorization request message to a transport computer 130.

At step S15, the transport computer 130 forwards the authorization request message to a processing network computer 140.

At step S16, the processing network computer further forwards the authorization request message to a token provider computer 150.

In some embodiments, the access device 120 may directly transmit the authorization request message to the token provider computer 150.

At step S17, the token provider computer 150 validates the cryptogram. In some embodiments, token provider computer 150 may verify that the cryptogram was generated by a valid limited use key and that the set of one or more limited use thresholds (e.g., a number of uses, a transaction amount, etc.) associated with the limited use key has not been exceeded. In this regard, the limited use key could be a symmetric key that corresponds to the limited use key stored on the mobile device. The cryptogram could be decrypted using the limited use key to obtain the transaction data such as the transaction amount, resource provider identifier, the access token such as a payment token, the terminal ID, the unpredictable number (UN), the automatic transaction counter (ATC), etc. This data may be matched to other data in the authorization request message to determine the validity of the authorization request message. In other embodiments, the data elements in the authorization request message could be encrypted using the limited use key, and the cryptogram could be compared with the cryptogram in the authorization request message to determine that the cryptogram is valid.

The token provider computer 150 then extracts the access token from the authorization request message. The token provider computer 150 may access a token mapping table and match the extracted access token to an access token in the token mapping table. At step S18, the token provider computer 150 may use the matched access token to identify a cryptocurrency address of the user within the token mapping table.

At step S19, the token provider computer 150 further extracts the cryptocurrency transaction identifier from the IAD field of the transaction data included within the authorization request message.

At step S20, the token provider computer 150 queries the same node (e.g., the initiator node) of the blockchain network 160 that was previously contacted by the mobile wallet application 105 in step S8 using the extracted cryptocurrency transaction identifier and the cryptocurrency address of the user, and possibly other information (e.g., the transaction amount).

The node of the blockchain network 160 may determine a transaction associated with the cryptocurrency transaction identifier and the cryptocurrency address of the user. In some embodiments, the node may locate the cryptocurrency transaction identifier in a block entry of the blockchain network 160. In other embodiments, the node may locate the cryptocurrency transaction identifier in a set of validated transactions that have yet to be added to a block entry.

At step S21, the node of the blockchain network 160 verifies the transaction associated with the cryptocurrency transaction identifier. Verification can occur in any suitable manner. In some embodiments, the node can identify the transaction using the cryptocurrency transaction identifier and can then determine if the transaction data associated with the transaction identifier and stored on the blockchain at the node is the same as the transaction data in the authorization request message.

At step S22, the node of the blockchain network 160 sends a transaction approval message to the token provider computer 150 after verifying the transaction.

After receiving the transaction approval message, the token provider computer 150 may generate an authorization response message using the received transaction approval message. In some embodiments, the authorization response message may be in an ISO message format. In some embodiments, the token provider computer 150 may instead receive the authorization response message from the blockchain network 160.

At step S23, the token provider computer 150 may transmit the authorization response message to the processing network computer 140.

At step S24, the processing network computer 140 may transmit the authorization response message to the transport computer 130.

At step S25, the transport computer 130 may transmit the authorization response message to the access device 120.

In other embodiments, the blockchain network 160 or the token provider computer 150 may transmit the authorization response message directly to the access device 120. Responsive to receiving the authorization request message, the access device 120 may display an authorization result based on the authorization response message. The resource provider may then decide whether or not to provide the good or service to the user based on the authorization result.

During settlement and clearing of the transaction, a cryptocurrency fee (e.g., from mining a next block of a blockchain) may be deducted from the cryptocurrency amount sent from the cryptocurrency address of the user. For example, if a transaction amount of $170 is determined to be equivalent to 1 Ethereum (ETH), the user may be charged 1 ETH by the resource provider along with an additional cryptocurrency fee of 0.00063 ETH, such that the user pays a total of 1.00063 ETH.

If the resource provider opted to instead receive a payment in fiat currency at step S4 and a cryptocurrency address of a third party service provider was used instead as the recipient of the transaction, the third-party service provider may deduct a fee from the transaction amount and transmit the transaction amount (e.g., in the form of fiat currency) to the transport computer 130 (e.g., or any suitable acquirer computer). For example, if a transaction amount of $170 is determined to be equivalent to 1 Ethereum (ETH), the third-party service provider may receive 1 ETH. The third-party service provider may then determine an original transaction amount in fiat currency (e.g., $170) deduct a fee from the original transaction amount and transmit the deducted transaction amount (e.g., such as $168 if there is a $2 fee) in fiat currency to transport computer 130. Transport computer 130 may then transmit the transaction amount in fiat currency ($168) to the resource provider.

In some embodiments where a user may conduct the transaction by transmitting a cryptocurrency transaction payment greater than the transaction amount provided by the resource provider, the blockchain network will transmit the difference back to the user. For example, if a user has 1 BTC and chooses to conduct a transaction with a resource provider for 0.25 BTC, the resource provider will receive 0.25 BTC and the remaining 0.75 BTC will be transmitted to another cryptocurrency address of the user.

Figure 5:
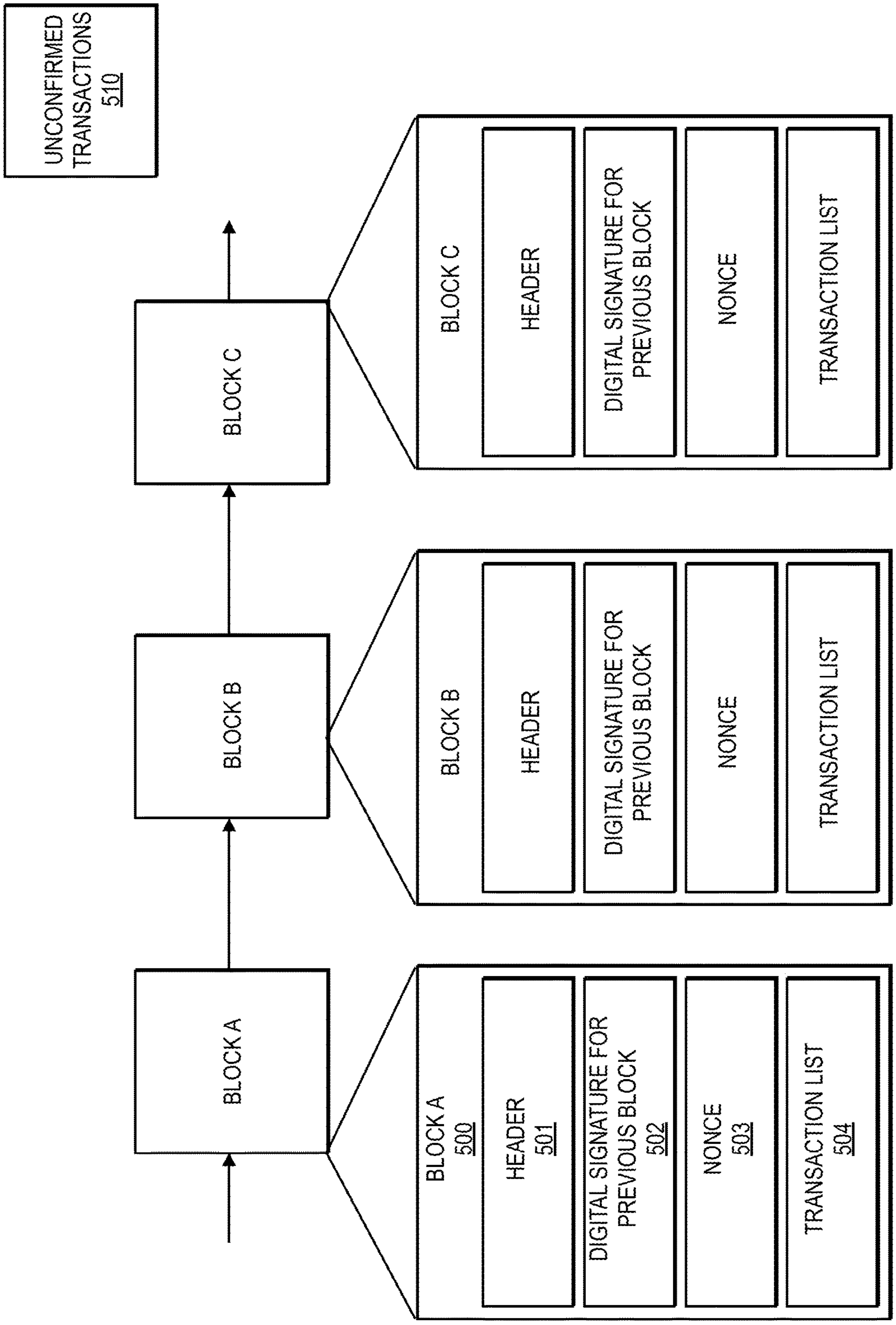
FIG. 5 shows a schematic diagram of a blockchain system according to an embodiment.

As discussed above, the transaction processing system may utilize a blockchain network 160 comprising a blockchain. FIG. 5 shows block entries of an exemplary blockchain within the blockchain network 160, in accordance with one embodiment of the invention.

In particular, FIG. 5 shows a blockchain comprising block entries for at least a block A, a block B, and a block C. The blockchain may also include additional block entries before a block A and/or after a block C, which are not depicted in the figure. For example, the blockchain can include block entries for a block D, a block E, a block F, etc.

Each block entry may comprise a header, a digital signature, a nonce, and information about a set of transactions. In some embodiments, each block entry may additionally include information from a previous block entry and/or be appended to a hash of a previous block entry, such that each block entry is connected with a plurality of previous block entries.

Referring to block A, header 501 may include a hash value that is unique to the block A, such that neither block B nor block C share a same header as block A. In some embodiments, header 501 include a hash of information from block A, information from a previous block (e.g., a hash of the previous block), and/or any other suitable information (e.g., such as a timestamp, a Merkle tree root, etc.).

Referring still to block A, a digital signature 502 may represent a hash of a previous block entry. In some embodiments, digital signature 502 may be a header of the previous block entry.

Nonce 503 may be a randomly generated number that is solved by a node (e.g., a user or computer) within the blockchain network 160 in order to validate block A and then add block A to the blockchain. Addition of a new block entry to the blockchain occurs when a new nonce for that block entry is solved by another node within the blockchain network.

Block A further includes a list of transactions 504, which may comprise transaction data for a plurality of cryptocurrency transactions that have been verified by the blockchain network 160. List of transactions 504 may comprise a list of cryptocurrency transaction identifiers, where each cryptocurrency transaction identifier is further associated with transaction data such as a transaction amount, an address of a transaction sender, and an address of a transaction recipient. In some embodiments, the list of transactions 504 may be hashed and merged to form a Merkle tree root. In some embodiments, the Merkle tree root can be used to generate header 501.

When adding a new block entry, the blockchain retrieves transactions for a new list of transactions for the block entry from a set of unconfirmed transactions 510 (e.g., referred to as a "mempool" in some cases). The set of unconfirmed transactions 510 may comprise transactions that have been validated but have not yet been added to a block entry. Responsive to receiving a new cryptocurrency transaction, one or more nodes within the blockchain network may validate a signature of the transaction and then transmit the transaction to the set of unconfirmed transactions 510. The transaction may then later be added to a new block entry of the blockchain and removed from the set of unconfirmed transactions 510. In embodiments of the present invention, a token provider computer may query both a blockchain and the set of unconfirmed transactions 510 using a cryptocurrency transaction identifier in order to determine if a transaction associated with the cryptocurrency transaction identifier has at least been validated. If the transaction associated with the cryptocurrency transaction identifier is not found within a block entry of the blockchain or the set of unconfirmed transactions 510, then the blockchain network may generate a transaction rejection message that indicates a transaction was invalid and transmit the transaction rejection message back to the token provider computer.

Figure 6:
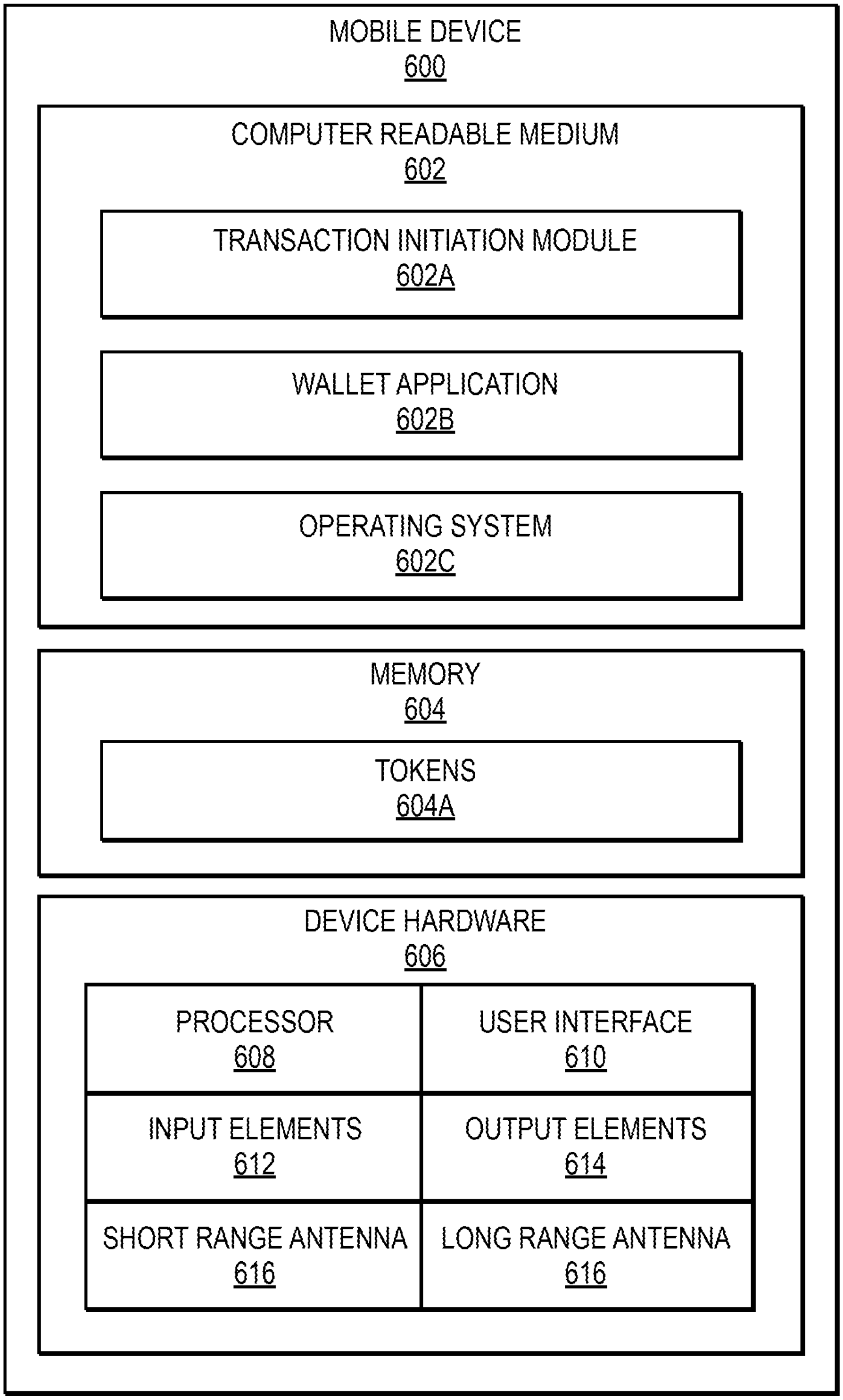
FIG. 6 shows a block diagram of a mobile communication device according to an embodiment.

FIG. 6 shows a block diagram of an exemplary mobile device 600 that can be used in embodiments of the invention. The mobile device 600 may be a phone, a tablet, a payment card, and/or any other suitable device configured for communication with an access device.

The mobile device 600 may comprise a computer readable medium 602, which can be in the form of (or may be included in) a memory element that stores data and can be in any suitable form (e.g., microSD chip, SIM card, or other type of memory element). The computer readable medium 602 may store a transaction initiation module 602A, one or more applications including at least a wallet application 602B, and an operating system 602C for the device. The transaction initiation module 602A may begin a transaction at the request of a user or the one or more applications (e.g., such as wallet application 602B). Wallet application 602B may be a digital wallet application configured to conduct cryptocurrency transactions by communicating with a blockchain network.

The mobile device 600 may also comprise a separate memory element 604, which can be configured to store static data such as a tokens module 604A. In embodiments, the tokens module 604A stores at least an access token associated with wallet application 602B. In other embodiments, the access token associated with wallet application 602B may instead be stored on a secure memory element of the mobile device 600.

The mobile device 600 may further include some device hardware 606, comprising at least: a processor 608, a user interface 610, input elements 612, and/or output elements 614. The device hardware 606 may also include a short range antenna 616 and a long range antenna 618 for communicating with a wireless network and/or other devices. All elements in the device hardware 606 are operatively coupled, enabling mutual communication and data transfer.

Figure 7:
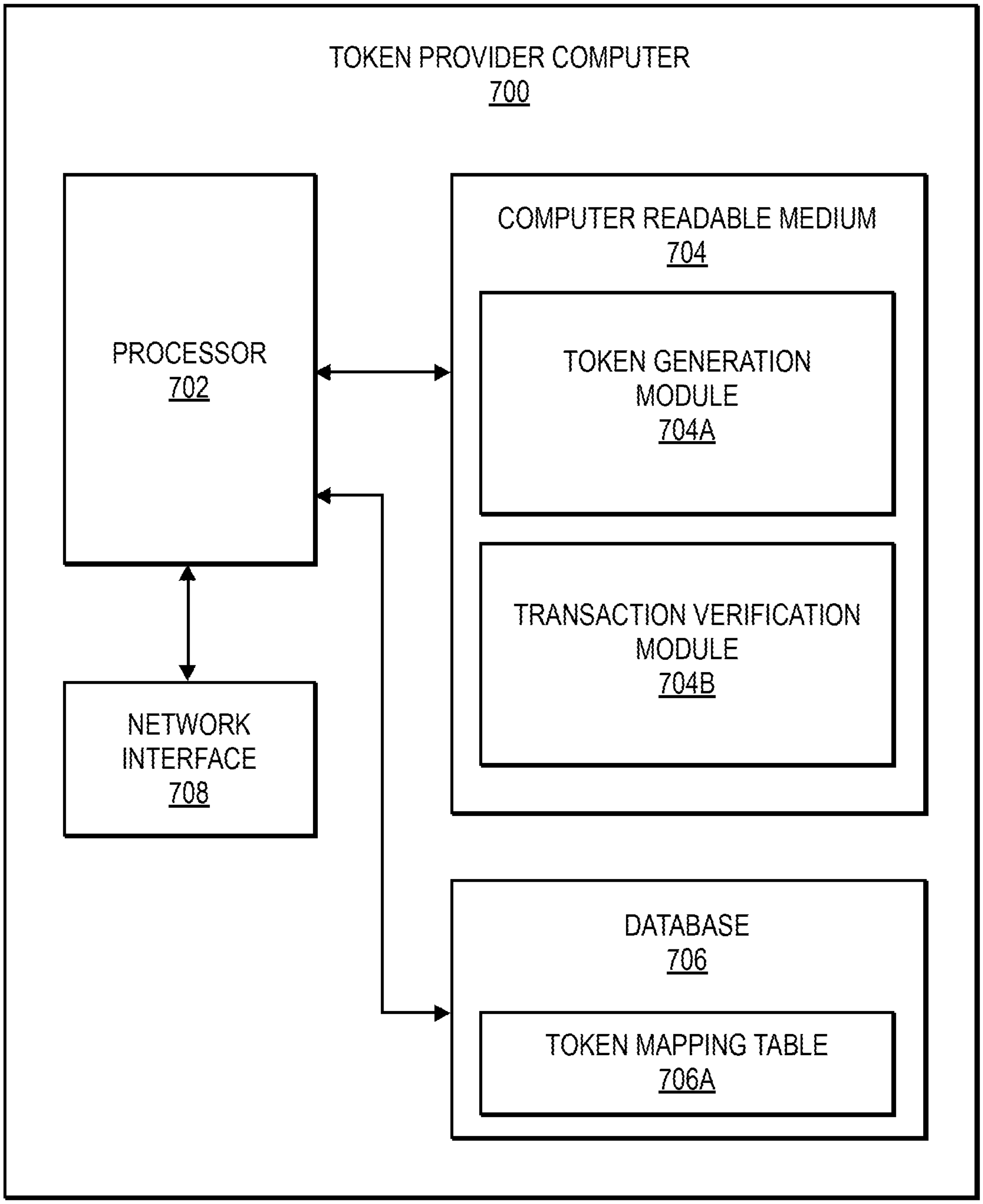
FIG. 7 shows a block diagram of a token provider computer according to an embodiment.

FIG. 7 shows a block diagram of a token provider computer 700 in accordance with embodiments of the invention. The token provider computer may include a processor 702 and a network interface 708 for receiving and transmitting messages (e.g. such as, but not limited to, a token request message or token response message) to one or more entities (e.g., mobile device 600 and/or a processing network computer).

The token provider computer 700 may include a non-transitory computer readable medium 704, comprising a token generation module 704A and a cryptogram verification module 704B. The token generation module 704A may include code, executable by the processor 702 to generate an access token that can be associated with a cryptocurrency address of a user. In some embodiments, token generation module 704A may also be substituted for a token retrieval module, which connects the token provider computer 700 to a database (e.g., database 706 or an outside database) that can provide the access token.

The transaction verification module 704B may be used, in conjunction with the processor 702, to determine the validity of a cryptogram received in an authorization request message. Transaction verification module 704B may be used, in conjunction with the processor 702, to transmit a request for verification of a cryptocurrency transaction to a blockchain network. In further embodiments, the transaction verification module 704B may generate an authorization response message based on a response for verification of a cryptocurrency transaction from the blockchain network.

The non-transitory computer readable medium 704 may comprise code, executable by the processor 702, for implementing a method comprising: receiving, by a token provider computer, an authorization request message comprising a cryptogram, an access token, and a cryptocurrency transaction identifier from an access device; validating, by the token provider computer, the cryptogram; mapping, the access token to a first cryptocurrency address; extracting the cryptocurrency transaction identifier from the authorization request message; and querying a node in a blockchain network with the first cryptocurrency address and the cryptocurrency transaction identifier to verify that a mobile application on a mobile device that interacted with the access device previously transmitted a signed cryptocurrency transaction to the node of the blockchain network.

FIG. 7 also shows a database 706 operatively coupled with the processor 702. Database 708 may include a token mapping table 708A comprising a plurality of access tokens that have been provisioned, wherein each access token of the plurality of access tokens is mapped to a cryptocurrency address of a user. In some embodiments, database 708 may further store tokens that are pre-generated prior to an association with a cryptocurrency address.

Embodiments of the invention have a number of technical advantages. As noted by the above examples, embodiments of the invention can utilize an existing payments infrastructure to securely process payment transactions using cryptocurrencies. As such, the computer architecture allows for many cryptocurrencies to be used for payments at a resource provider, without the need to update existing access device hardware or software. Embodiments of the invention also allow for a resource provider to receive either cryptocurrency or fiat currency even if the user wanted to pay for the transaction using cryptocurrency.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

initiating, by a mobile application stored on a mobile device operated by a first user, communication with an access device operated by a second user in a transaction between the first user and the second user;

transmitting, by the mobile application, a request for transaction data to the access device;

receiving, by the mobile application, the transaction data comprising a transaction amount and a second cryptocurrency address from the access device;

receiving, by the mobile application from a token provider computer, an access token and a private cryptographic key, wherein the access token comprises a payment token associated with a first cryptocurrency address;

in response to receiving the transaction data from the access device, signing, by the mobile application using the private cryptographic key, the first cryptocurrency address, the second cryptocurrency address, and the transaction amount to create a signed cryptocurrency transaction;

transmitting, by the mobile application, the signed cryptocurrency transaction directly to a node of a blockchain network;

receiving, by the mobile application, a cryptocurrency transaction identifier from the node;

subsequently generating, by the mobile application, a cryptogram using at least the access token on the mobile application and at least some of the transaction data;

transmitting, by the mobile application, at least the cryptogram, the access token, and the cryptocurrency transaction identifier to the access device;

generating, by the access device, an authorization request message in an International Organization for Standardization (ISO) 8583 format, comprising the access token, the cryptogram, and the transaction data, requesting authorization for the transaction;

transmitting, by the access device, the authorization request message to the token provider computer;

validating, by the token provider computer, the cryptogram responsive to the authorization request message;

mapping, by the token provider computer, the access token to the first cryptocurrency address;

extracting, by the token provider computer, the cryptocurrency transaction identifier from the authorization request message, and querying the node in the blockchain network with the first cryptocurrency address and the cryptocurrency transaction identifier to verify that the mobile application previously transmitted the signed cryptocurrency transaction to the node of the blockchain network;

based on the verified signed cryptocurrency transaction and validated cryptogram, transmitting, by the token provider computer, an authorization response message in the ISO 8583 format approving of the transaction to the access device;

thereby causing the transaction amount to be transferred from the first cryptocurrency address to the second cryptocurrency address; and updating, by the mobile application, a recorded balance by decrementing the transferred transaction amount.

2. The method of claim 1, wherein the second cryptocurrency address is associated with the second user.

3. The method of claim 1, wherein the second cryptocurrency address is associated with a third party service provider that is not the second user.

4. The method of claim 1, wherein the node of the blockchain network verifies the signed cryptocurrency transaction with a public key associated with the mobile application, before sending the cryptocurrency transaction identifier to the mobile application.

5. The method of claim 1, wherein the mobile device is a mobile phone.

6. The method of claim 1, wherein the first cryptocurrency address and the second cryptocurrency address are public keys.

7. The method of claim 1, wherein the request for transaction data is included within a processing options data object list (PDOL) message between the mobile device and the access device.

8. The method of claim 1, wherein the mobile device is a mobile phone with NFC capability.

9. A system comprising a mobile device, an access device, and a token provider computer, the system comprising:

a respective set of processors; and a respective set of computer readable media, the computer readable media comprising code, executable by the processors to implement a method comprising:

initiating, by a mobile application stored on the mobile device operated by a first user, communication with the access device, which is operated by a second user in a transaction between the first user and the second user;

transmitting, by the mobile application, a request for transaction data to the access device;

receiving, by the mobile application, the transaction data comprising a transaction amount and a second cryptocurrency address associated with the second user from the access device;

receiving, by the mobile application from a token provider computer, an access token and a private cryptographic key, wherein the access token comprises a payment token associated with a first cryptocurrency address;

in response to receiving the transaction data from the access device, signing, by the mobile application using the private cryptographic key, the first cryptocurrency address, the second cryptocurrency address, and the transaction amount to create a signed cryptocurrency transaction;

transmitting, by the mobile application, the signed cryptocurrency transaction directly to a node of a blockchain network;

receiving, by the mobile application, a cryptocurrency transaction identifier from the node;

subsequently generating, by the mobile application, a cryptogram using at least the access token on the mobile application and at least some of the transaction data;

transmitting, by the mobile application, at least the cryptogram, the access token, and the cryptocurrency transaction identifier to the access device;

generating, by the access device, an authorization request message in an International Organization for Standardization (ISO) 8583 format, comprising the access token, the cryptogram, and the transaction data, requesting authorization for the transaction;

transmitting, by the access device, the authorization request message to the token provider computer;

validating, by the token provider computer, the cryptogram responsive to the authorization request message;

mapping, by the token provider computer, the access token to the first cryptocurrency address;

extracting, by the token provider computer, the cryptocurrency transaction identifier from the authorization request message, and querying the node in the blockchain network with the first cryptocurrency address and the cryptocurrency transaction identifier to verify that the mobile application previously transmitted the signed cryptocurrency transaction to the node of the blockchain network;

based on the verified signed cryptocurrency transaction and validated cryptogram, transmitting, by the token provider computer, an authorization response message in the ISO 8583 format approving of the transaction to the access device;

thereby causing the transaction amount to be transferred from the first cryptocurrency address to the second cryptocurrency address; and updating, by the mobile application, a recorded balance by decrementing the transferred transaction amount.

10. The mobile device of claim 9, further comprising a memory storing a limited-use key, wherein the limited-use key is used to generate the cryptogram.

11. The system of claim 9, in the method, responsive to receiving the transaction data, the mobile application performs an authentication process of the first user.

12. The system of claim 9, wherein the second cryptocurrency address is associated with the second user.

13. The system of claim 9, wherein the second cryptocurrency address is associated with a third party service provider that is not the second user.

14. The system of claim 9, wherein the mobile device is a mobile phone.

15. The system of claim 9, wherein the first cryptocurrency address and the second cryptocurrency address are public keys.

* * * * *